United States Patent
Lin et al.

(10) Patent No.: US 8,305,354 B2
(45) Date of Patent: Nov. 6, 2012

(54) ELECTRONIC BOOK DEVICE AND METHOD FOR OPERATING THE SAME

(75) Inventors: Shun-Hsing Lin, Taipei Hsien (TW); Wen-Ching Tu, Taipei Hsien (TW)

(73) Assignee: Inventec Appliances Corp., Taipei Hsien (TW)

( * ) Notice: Subject to any disclaimer, the term of this patent is extended or adjusted under 35 U.S.C. 154(b) by 358 days.

(21) Appl. No.: 12/725,835

(22) Filed: Mar. 17, 2010

(65) Prior Publication Data

US 2010/0238130 A1    Sep. 23, 2010

(30) Foreign Application Priority Data

Mar. 17, 2009  (TW) .............................. 98108634 A

(51) Int. Cl.
*G06F 3/041* (2006.01)
*G09G 5/00* (2006.01)

(52) U.S. Cl. ........................ 345/173; 345/1.1; 345/1.2

(58) Field of Classification Search ............ 345/1.1–1.3, 345/156–178
See application file for complete search history.

(56) References Cited

U.S. PATENT DOCUMENTS

| | | | | |
|---|---|---|---|---|
| 5,956,019 A | * | 9/1999 | Bang et al. | 345/173 |
| 2008/0072163 A1 | * | 3/2008 | Teng et al. | 715/761 |
| 2009/0320070 A1 | * | 12/2009 | Inoguchi | 725/40 |

* cited by examiner

*Primary Examiner* — Amr Awad
*Assistant Examiner* — Kenneth Bukowski
(74) *Attorney, Agent, or Firm* — Muncy, Geissler, Olds & Lowe, PLLC

(57) ABSTRACT

An electronic book device and a method for operating the electronic book device are disclosed, wherein the electronic book device includes a memory module, an electronic paper, a touch display and a first touch control module. The touch display is separate from the electronic paper and has a touch panel. The memory module can store an electronic book. The electronic paper can display a first frame according to the electronic book. The first touch control module can control the first frame when the touch panel is touched.

9 Claims, 3 Drawing Sheets

ELECTRONIC BOOK DEVICE AND METHOD FOR OPERATING THE SAME

RELATED APPLICATIONS

This application claims priority to Taiwan Application Serial Number 98108634, filed Mar. 17, 2009, which is herein incorporated by reference.

BACKGROUND

1. Technical Field

The present disclosure relates to electronic devices, and more particularly, an electronic book device and a method for operating the electronic book device.

2. Description of Related Art

Electronic paper, e-paper or electronic ink display is a display technology designed to mimic the appearance of ordinary ink on paper. Unlike a conventional flat panel display, which uses a backlight to illuminate its pixels, electronic paper reflects light like ordinary paper and is capable of holding text and images indefinitely without drawing electricity, while allowing the image to be changed later.

To build e-paper, several different technologies exist, some using plastic substrate and electronics so that the display is flexible. E-paper is considered more comfortable to read than conventional displays. This is due to the stable image, which does not need to be refreshed constantly, the wider viewing angle, and the fact that it reflects ambient light rather than emitting its own light. An e-paper display can be read in direct sunlight without the image fading.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

In one or more aspects, the present disclosure is directed to an electronic book device and a method for operating the electronic book device.

According to one embodiment of the present invention, the electronic book device includes a memory module, an electronic paper, a touch display and a first touch control module. The touch display is separate from the electronic paper and has a touch panel. The memory module can store an electronic book. The electronic paper can display a first frame according to the electronic book. The first touch control module can control the first frame when the touch panel is touched. In use, the touch display can detect the presence and location of a touch without reducing or degrading the clearness of the electronic paper.

According to another embodiment of the present invention, the method for operating an electronic book device comprising an electronic paper and a touch panel separate from the electronic paper. The method includes the following steps: an electronic book is stored; a first frame is displayed on an electronic paper according to the electronic book; and the first frame is controlled when a touch panel is touched. In use, the touch display can detect the presence and location of a touch without reducing or degrading the clearness of the electronic paper.

Many of the attendant features will be more readily appreciated, as the same becomes better understood by reference to the following detailed description considered in connection with the accompanying drawings.

BRIEF DESCRIPTION OF THE DRAWINGS

The present description will be better understood from the following detailed description read in light of the accompanying drawing, wherein.

DETAILED DESCRIPTION

Figure 1:
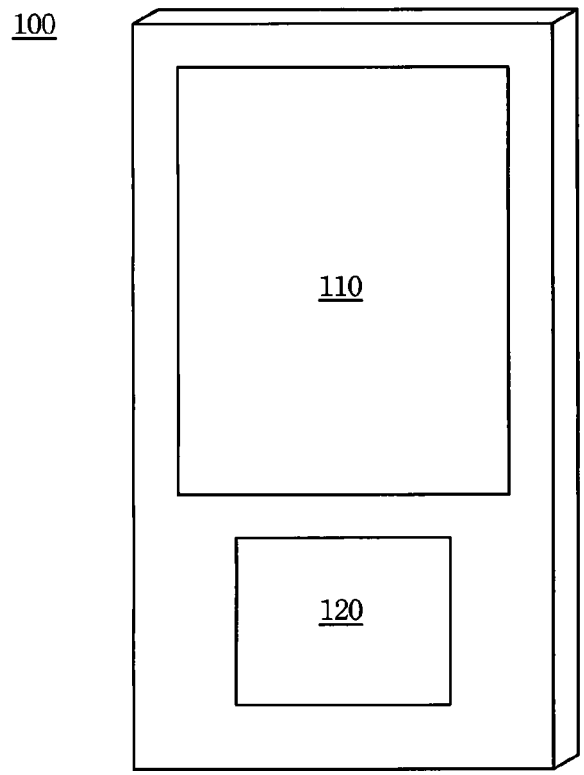
FIG. 1 is a perspective view of an electronic book device according to one embodiment of the present invention.

In the following detailed description, for purposes of explanation, numerous specific details are set forth in order to attain a thorough understanding of the disclosed embodiments. It will be apparent, however, that one or more embodiments may be practiced without these specific details. In other instances, well-known structures and devices are schematically shown in order to simplify the drawing.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

Unless otherwise defined, all terms (including technical and scientific terms) used herein have the same meaning as commonly understood by one of ordinary skill in the art to which embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In practice, an electronic book device, sometimes also called an e-book reader, includes electronic paper. Experiments made by the inventors have revealed that the transmittance of the electronic paper is adversely reduced if a touch panel is superimposed on the electronic paper. This causes the degradation in the quality of reading. Based on this finding, the touch panel is removed from the surface of the electronic paper so as to improve the transmittance of the electronic paper; however, the electronic book device without the touch panel is incapable of supporting touch control.

In one aspect, the present disclosure is directed to an electronic book device. The electronic book device may be easily applied to existing electronic book devices and may be applicable or readily adaptable to various technologies. The description will be made as to the embodiments of the present disclosure in conjunction with the accompanying drawing FIGS. 1-3.

As shown in FIG. 1, the electronic book device 100 comprises electronic paper 110 and a touch display 120. The touch display 120 is separate from the electronic paper 110.

In use, the touch display 120 doesn't adversely affect the transmittance is of the electronic paper 110 because the touch display 120 isn't superimposed on the electronic paper 110; therefore, the electronic paper 110 can display the frame clearly. The touch display 120 is a display that can detect the presence and location of a touch within the display area.

The touch display 120 may be a resistive touch display and/or a capacitive touch display. It should be appreciated that the resistive and capacitive touch display are only examples and should not be regarded as limitations of the present invention. Those with ordinary skill in the art may design the touch display 120 depending on the desired application; for example, the touch display 120 may be a surface acoustic wave touch display. For a more complete understanding of the touch display 120, the description will be made as to the embodiments of the present disclosure in conjunction with the accompanying drawing FIG. 2.

Figure 2:
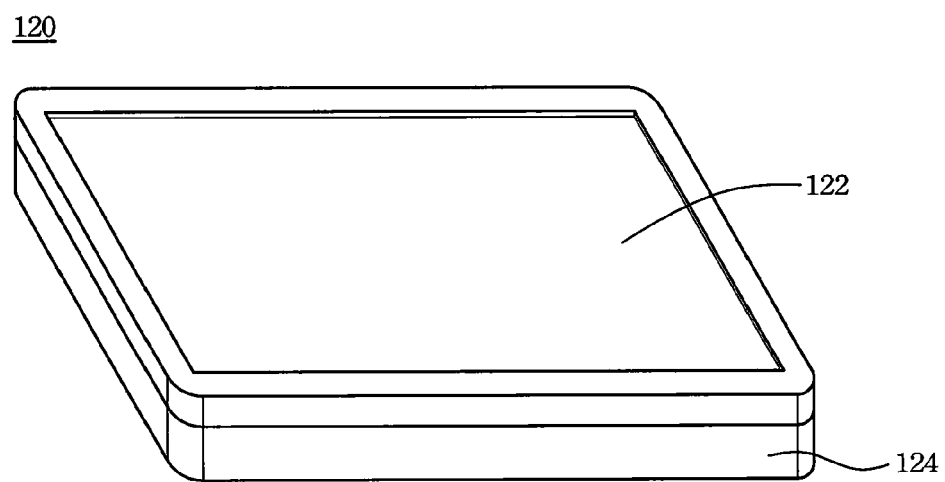
FIG. 2 is a perspective view of a touch display employed in the electronic book of FIG. 1.

FIG. 2 is a perspective view of a touch display employed in the electronic book 100 of FIG. 1. The touch display 120 comprises a touch panel 122 and a color display 124. The color display 124 is disposed under the touch panel 122.

In use, the color display 124 can display a color image, and the touch panel 122 can detect the presence and location of a touch within the display area.

The touch display 120 may be a resistive touch display. The touch panel 122 may comprise a polyester film and a glass plate. The inner part of polyester film has a metal conductive film. The conductive material is coated on the glass plate, and the glass plate is attached on the color display 124, such as a cathode-ray tube display or a liquid crystal display. Tiny spacers made from polyester are disposed between the polyester film and the glass plate. Two controllers are disposed along an X-axis of the glass plate and a Y-axis of the polyester film respectively for applying voltage gradient. When an object, such as a finger, presses down on a point on the resistive touch display, the polyester film and the glass plate become connected at that point, so that the electronic book device can detect the X-coordinate and the Y-coordinate of the point.

Alternatively, the touch display 120 may be a capacitive touch display. The touch panel 122 may comprise a glass plate. The conductive material is coated on the opposing surface of the glass plate, and the outside of the glass plate is covered with a scratch-resistant coating. Electrodes around the glass plate generate a uniform electric field on the outer conducting layer; the inner conducting layer serves as an electromagnetic shield and reduces noise. When a finger touches a point on the capacitive touch display, the electromagnetic shield on the outer conducting layer is distorted, and the capacitive touch display attracts an electric current through a capacitive coupling between the finger and the outer conducting layer. The electrodes measure the electric current, and a controller can detect a X-coordinate and a Y-coordinate of the point touched by the finger.

Alternatively, the touch display 120 may be a surface acoustic wave touch display. The touch panel 122 may be a glass plate on the color display 124. The glass plate may have no coating. Converters disposed at four corners of the screen can transform signals sent by a controller into ultrasonic waves that pass over the glass plate; reflectors disposed along four edges of the screen can generate a standing wave. When the screen is touched, a portion of the wave is absorbed; the converters measure this change in the ultrasonic waves, so that the controller can calculate the position of the touch event.

Said examples of the touch panel 122 are merely provided for illustration and exemplification, but are not used to limit the scope of the present invention. Those with ordinary skill in the art may design a touch panel 122 depending on the desired application.

In use, the electronic paper has low power consumption without flicker effects; however, the electronic paper is mainly to provide gray scale display because it is hard for the electronic paper to provide color display as color printing. Therefore, in the present embodiment, the electronic paper 110 is used for displaying black—and —white or gray scale text, and the color display 124 is used for displaying color pictures.

In view of the above and Figures, the electronic book device 100 has both the electronic paper 110 and the touch display 120. Thus, the electronic book device 100 serves as a multifunction e-book reader. For a more complete understanding of the electronic book device 100, the description will be made as to the embodiments of the present disclosure in conjunction with the accompanying drawing FIG. 3.

Figure 3:
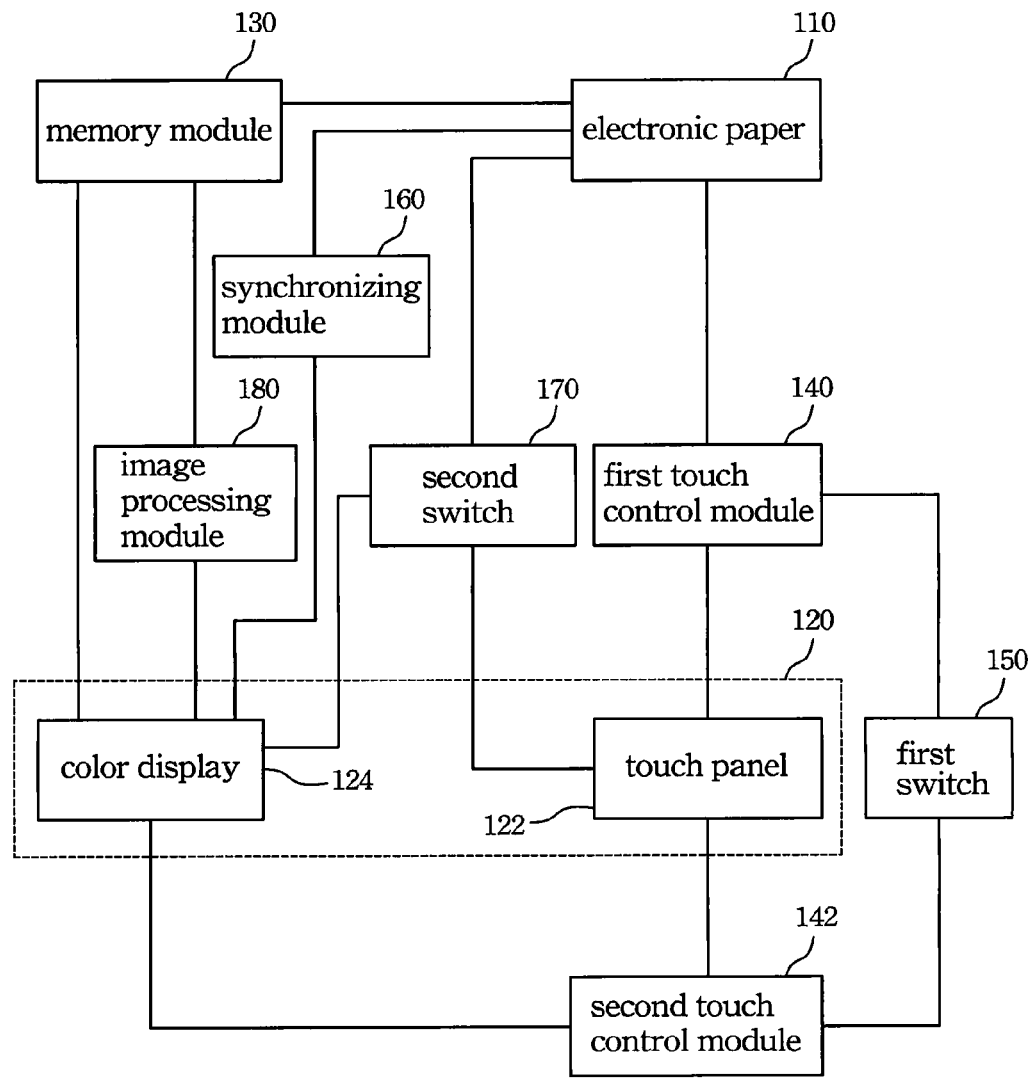
FIG. 3 is a block diagram of the electronic book of FIG. 1.

FIG. 3 is a block diagram of the electronic book 100 of FIG. 1. The to electronic book device 100 comprises a memory module 130. In this embodiment, the memory module 130 can store an electronic book.

The electronic book in general can be a digital version of book or an e-paper magazine. The electronic book can read on the electronic book device 100 and can be easily transmitted through a network. The electronic book is an e-text that forms the digital media equivalent of a conventional printed book having chapters and sections. The electronic books are published through computers so as to simplify traditional processes, such as print planning or the like.

The electronic paper 110 can display the first frame according to the electronic book stored in the memory module 130. The first frame may comprise text/image information of the electronic book; for example, the first frame displayed on the electronic paper 110 comprises text of the electronic book, so that a user can read the text of the electronic book by the electronic paper 110.

The electronic book device 100 comprises a first touch control module 140. In use, the first touch control module 140 can control the first frame displayed on the electronic paper 110 when the touch panel 122 is touched.

Thus, the user may control the first frame displayed on the electronic paper 110 by touching the touch panel 122. For example, the electronic paper 110 displays one page of the electronic book, and the user touches the touch panel 122 to execute some instructions, such as page turning, marking or the like.

The color display 124 can display the second frame according to the electronic book stored in the memory module 130. The second frame may comprise text/image information of the electronic book; for example, the second frame displayed on the color display 124 comprises a color picture of the electronic book, so that a user can watch the color picture of the electronic book by the touch display.

The electronic book device 100 can comprise a first switch 150 and a second touch control module 142. In use, the first switch 150 is used to disable the first touch control module 140 and enable the second touch control module 142; the second touch control module 142 is used to control the second frame displayed on the color display 124 when the first touch control module 140 is disabled and the touch panel 122 is touched.

Thus, the user may control the second frame displayed on the electronic paper 110 by touching touch panel 122. For example, the color display 124 displays one picture of the electronic book, and the user touches the touch panel 122 to enlarge or reduce the picture.

Additionally or alternatively, the first switch 150 is used to disable the second touch control module 142 and enable the first touch control module 140, in order to control the first frame by the first touch control module 140 when the touch panel 122 is touched and the second touch control module 142 is disabled.

The electronic book device 100 can comprise a synchronizing module 160. In use, the synchronizing module 160 is used to direct the color display 124 to display the second frame corresponding with the first frame, and wherein the second touch control module 142 is further used for enlarging at least a picture in the second frame if the picture is selected through the touch panel 122.

Thus, the color display 124 and the electronic paper 110 display the same frame. The user may touch the touch panel 122 to select one picture in the frame, so that the color display 124 can display the enlarged picture.

The electronic book device 100 can comprise a second switch 170. In use, the second switch 170 is used for activating the color display 124 to display at least a picture in the first frame if the picture is selected through the touch panel 122.

Thus, when the color display 124 isn't activated, the user may touch the touch panel 122 to select one picture displayed on the electronic paper 110, so that the color display 124 can display the selected picture.

The electronic book device 100 can comprise an image processing module 180. In use, the image processing module 180 is used to search for at least one picture in the electronic book and for directing the color display 124 to display the picture.

Thus, the image processing module 180 can find out all pictures automatically, and the color display 124 displays these pictures. The user may touch the touch panel 122 to select one picture from these pictures displayed on the color display 124, so that the second touch control module 142 can enlarge the selected picture in the frame displayed on the color display 124.

In practice, the memory module 130, the first touch control module 140, the second touch control module 142, the first switch 150, the second switch 170 and the image processing module 180 are integrated in software programs and/or hardware circuitry. Those with ordinary skill in the art may opt for the desired implementation that could be software programs, hardware circuitry or a portion of software programs and a portion of hardware circuitry.

In accordance with above-mentioned embodiments, black-and-white or gray scale text of the electronic book is displayed on the electronic paper 110, and color pictures of the electronic book are displayed on the color display 124. In general, the proportion of pictures to text is not too much; for example, an electronic book has 200 pages in which 25 pages include pictures; therefore, when a user reads this electronic book, the color display 122 is turned on during about 1/16 of the read time, and the color display 122 is turned off during about 15/16 of the read time. In use, the electronic paper 110 has low power consumption without flicker effects, and the time duration of turning on the color display 122 is relatively short; therefore, the increase of power consumption is negligible.

Thus, the touch display 120 has no need for backlight if the color display 122 doesn't display images. The touch panel 122 supports the touch control, no matter whether the color display 124 is turned on or off. For example, the user may touch the touch panel 122 to control the frame displayed on the electronic paper 110 or the color display 124.

In another aspect, the present disclosure is directed to a method for operating an electronic book device, such as the electronic book device 100. The method may be easily applied to existing electronic book devices and may be applicable or readily adaptable to various technologies. The description will be made as to the embodiments of the present disclosure in conjunction with the accompanying drawing FIG. 4.

Figure 4:
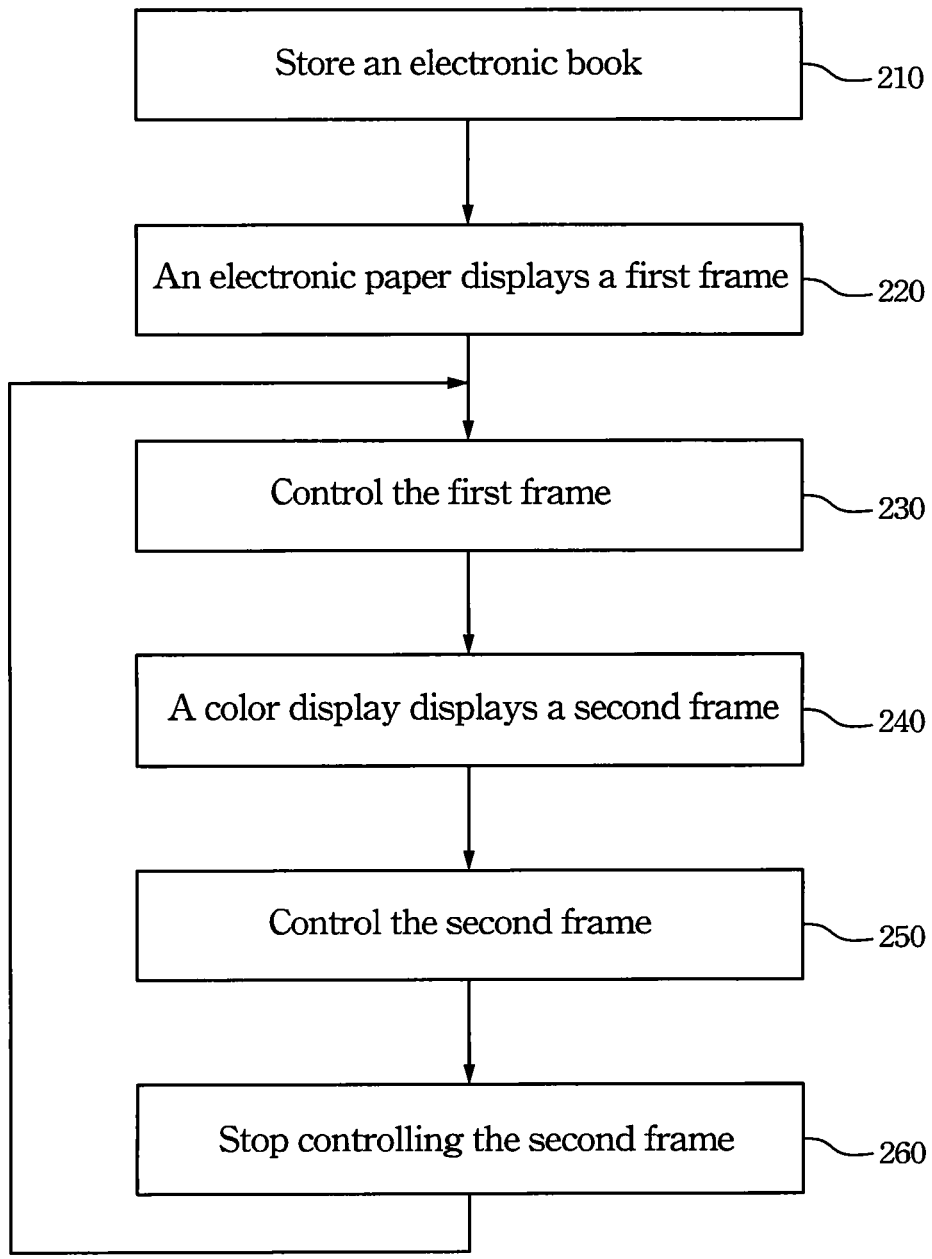
FIG. 4 is a flowchart of a method for operating the electronic book device according to another embodiment of the present invention.

FIG. 4 is a flowchart of the method 200 for operating the electronic book device according to another embodiment of the present invention. As shown in FIG. 4, the method 200 comprises step 210, step 220 and step 230 as follows (The steps are not recited in the sequence in which the steps must be performed. That is, unless the sequence of the steps is expressly indicated, the sequence of performing the steps may be changed, and one or more of the steps may be simultaneously, partially simultaneously, or sequentially performed).

In step 210, an electronic book is stored; in step 220, a first frame is displayed on an electronic paper according to the electronic book; in step 230, the first frame is controlled when a touch panel is touched, where the touch panel is separate from the electronic paper.

The electronic book in the method 200 can be a digital version of book or an e-paper magazine. The electronic book can read on the electronic device, such as a cellular phone or a PDA, and can be easily transmitted through a network. The electronic book is an e-text that forms the digital media equivalent of a conventional printed book having chapters and sections. The electronic books may be published through computer networks so as to simplify traditional processes of publishing, and can generally make reading activities more convenient for a reader.

During step 220, the first frame displayed on the electronic paper may comprise text/image information of the electronic book; for example, the first frame displayed on the electronic paper comprises text of the electronic book, so that a user can read the text of the electronic book by the electronic paper.

During step 230, the user may control the first frame displayed on the electronic paper by touching touch panel. For example, the electronic paper displays one page of the electronic book, and the user touches the touch panel to execute some instructions, such as page turning, marking or the like.

As shown in FIG. 4, the method 200 may further comprise step 240. In step 240, a second frame is displayed on a color display according to the electronic book.

During step 240, the second frame displayed on the color display may comprise text/image information of the electronic book; for example, the second frame displayed on the electronic paper comprises text of the electronic book, so that a user can read the text of the electronic book by the color display.

As shown in FIG. 4, the method 200 may further comprise step 250. The step 250 is to stop controlling the first frame displayed on the electronic paper and to control the second frame displayed on the color display when the touch panel is touched.

During the step 250, the user may control the second frame displayed on the electronic paper by touching the touch panel.

For example, the color display displays one picture of the electronic book, and the user touches the touch panel to enlarge or reduce the picture.

As shown in FIG. 4, the method 200 may further comprise step 260. The step 260 is to stop controlling the second frame displayed on the color display. And then the step 230 may be performed anew; therefore, when the step of controlling the second frame is stopped, the first frame that is displayed on the electronic paper is controlled in step 230 when the touch panel is touched.

In addition, the step 240 may be to display the second frame corresponding with the first frame. The step 250 may be to enlarge at least a picture in the second frame if the picture is selected through the touch panel.

Thus, the color display and the electronic paper display the same frame. The user may touch the touch panel to select one picture in the frame, so that the color display can display the enlarged picture.

With the color display of the electronic book device, the method may further include a step of activating the color display to display at least a picture in the first frame if the picture is selected through the touch panel. Thus, when the color display isn't activated, the user may touch the touch panel to select one picture displayed on the electronic paper, so that the color display can display the selected picture.

The method may further include steps of searching for at least one picture in the electronic book and directing a color display to display the picture. Thus, all pictures may be found out automatically, and the color display displays these pictures. The user may touch the touch panel to select one picture from these pictures displayed on the color display, so that the selected picture is enlarged in the frame displayed on the color display.

The reader's attention is directed to all papers and documents which are filed concurrently with his specification and which are open to public inspection with this specification, and the contents of all such papers and documents are incorporated herein by reference.

It will be understood that the above description of embodiments is given by way of example only and that those with ordinary skill in the art may make various modifications. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

Any element in a claim that does not explicitly state "means for" performing a specified function, or "step for" performing a specific function, is not to be interpreted as a "means" or "step" clause as specified in 35 U.S.C. §112, 6th paragraph. In particular, the use of "step of" in the claims herein is not intended to invoke the provisions of 35 U.S.C. §112, 6th paragraph.

What is claimed is:

1. An electronic book device comprising:
a memory module for storing an electronic book;
an electronic paper for displaying a first frame according to the electronic book;
a touch display separate from the electronic paper and comprising a touch panel and a color display disposed under the touch panel for displaying a second frame according to the electronic book; and
a first touch control module for controlling the first frame when the touch panel is touched;
a first switch for disabling the first touch control module;
a second touch control module used to control the second frame when the first touch control module is disabled and the touch panel is touched, wherein the first switch is further used for enabling the second touch control module; and
a synchronizing module for directing the color display to display the second frame corresponding with the first frame, wherein the second touch control module is further used for enlarging at least a picture in the second frame if the picture is selected through the touch panel.

2. The electronic book device of claim 1, wherein the first switch is further used for disabling the second touch control module and for enabling the first touch control module, in order to control the first frame by the first touch control module when the touch panel is touched and the second touch control module is disabled.

3. The electronic book device of claim 1, further comprising:
a second switch used for activating the color display to display the picture in the first frame if the picture is selected through the touch panel.

4. The electronic book device of claim 1, further comprising:
an image processing module for searching for the picture in the electronic book and for directing the color display to display the picture.

5. A method for operating an electronic book device comprising an electronic paper, a color display, and a touch panel separate from the electronic paper, the method comprising:
storing an electronic book;
displaying a first frame on the electronic paper according to the electronic book;
controlling the first frame when the touch panel is touched;
displaying a second frame on the color display according to the electronic book, the color display disposed under the touch panel;
stopping controlling the first frame by a switch; and
controlling the second frame when the touch panel is touched, including enlarging at least a picture in the second frame if the picture is selected through the touch panel.

6. The method of claim 5, further comprising:
stopping controlling the second frame.

7. The method of claim 5, wherein the step of displaying the second frame comprises:
displaying the second frame corresponding with the first frame.

8. The method of claim 5, wherein the method further comprises:
activating the color display to display the picture in the first frame if the picture is selected through the touch panel.

9. The method of claim 5, further comprising:
searching for the picture in the electronic book; and
directing a color display to display the picture.

* * * * *